(12) United States Patent
Belov et al.

(10) Patent No.: US 6,703,334 B2
(45) Date of Patent: Mar. 9, 2004

(54) METHOD FOR MANUFACTURING STABILIZED ZIRCONIA

(75) Inventors: Vladimir Belov, Zionsville, IN (US); Irina Belov, Zionsville, IN (US)

(73) Assignee: Praxair S.T. Technology, Inc., North Haven, CT (US)

( * ) Notice: Subject to any disclaimer, the term of this patent is extended or adjusted under 35 U.S.C. 154(b) by 0 days.

(21) Appl. No.: 10/015,621

(22) Filed: Dec. 17, 2001

(65) Prior Publication Data

US 2003/0113254 A1 Jun. 19, 2003

(51) Int. Cl.⁷ .............................................. C04B 35/48
(52) U.S. Cl. ........................................ 501/103; 423/608
(58) Field of Search ............................ 501/103; 423/608

(56) References Cited

U.S. PATENT DOCUMENTS

| | | | |
|---|---|---|---|
| 3,957,500 A | 5/1976 | Pitts | 106/57 |
| 3,961,026 A | 6/1976 | Pokhodenko et al. | 423/419 |
| 4,283,377 A | 8/1981 | Fenner | 423/419 |
| 4,360,598 A | 11/1982 | Otagiri et al. | 501/103 |
| 4,542,110 A | 9/1985 | Nakada et al. | 501/103 |
| 4,722,833 A | 2/1988 | Kato | 423/608 |
| 4,810,680 A | 3/1989 | Bickford et al. | 501/103 |
| 5,252,310 A | 10/1993 | Recasens et al. | 423/462 |
| 5,252,316 A | 10/1993 | Kriechbaum et al. | 423/608 |
| 5,420,086 A * | 5/1995 | Brandau et al. | 501/103 |
| 5,750,459 A | 5/1998 | Marella et al. | 502/304 |
| 6,044,830 A | 4/2000 | Jones | 123/670 |
| 6,255,242 B1 | 7/2001 | Umemoto et al. | 501/103 |

FOREIGN PATENT DOCUMENTS

JP 59069471 * 4/1984

OTHER PUBLICATIONS

Xu et al., Preparation of Weakly Agglomerate Nanometer $ZrO_2$(3 mol% $Y_2O_3$) Ceramic Powder, Journal of the European Ceramic Society (1993) pp. 157–160.

Maschio et al., "Powder Preparation and Sintering Behaviour of $ZrO_2$–20 mol.–%$CeO_2$ Solid Solutions Prepared by Various Methods", British Ceramic Transactions, vol. 94, No. 5 (1995) pp. 191–195.

\* cited by examiner

*Primary Examiner*—Paul Marcantoni
(74) *Attorney, Agent, or Firm*—Gerald L. Coon

(57) ABSTRACT

The process produces a stabilized zirconia powder by first contacting zirconium basic carbonate particles with a stabilizer compound. This reacts the zirconium basic carbonate particles with the stabilizer compound through heterogeneous contact to form a stabilized zirconia precursor. The stabilizer compound is for stabilizing a phase structure selected from the group consisting of tetragonal phase, cubic phase and mixtures of tetragonal and cubic phases. And calcining the stabilized zirconia precursor removes gaseous by-products and forms the stabilized zirconia powder. The stabilized zirconia powder has a phase structure selected from the group consisting of tetragonal, cubic and mixtures of tetragonal and cubic.

20 Claims, No Drawings

METHOD FOR MANUFACTURING STABILIZED ZIRCONIA

TECHNICAL FIELD

The present invention relates to a method for producing zirconium oxide (zirconia) having a stabilized tetragonal or cubic structure.

BACKGROUND ART

Manufacturers use stabilized zirconia powders (SZ), typically zirconia stabilized with yttria (YSZ), to produce zirconia-based bulk ceramics and ceramic coatings. YSZ coatings form particularly effective thermal barrier coatings (TBCs) for gas turbine engines. The critical characteristic of this YSZ powder responsible for performance at high temperatures is homogeneity of the yttria stabilizer distribution throughout the zirconia crystal lattice. Insufficient homogeneity reveals itself as a presence of deleterious monoclinic phase or non-stabilized zirconia. Unfortunately, excessive amounts of monoclinic phase tend to shorten a TBC's life and increase repair frequency for gas turbine engines.

There are two common methods for manufacturing SZ powders. The "wet-chemical" approach relies on mixing of a zirconium salt solution and a solution of metal-stabilizer followed by a separation of a solid, containing both of the metals. Commonly manufacturers separate the solid by co-precipitation and filtering of metal hydroxides; but they can rely on other separation techniques such as, sol-gel, evaporation and spray-pyrolysis. For example, Xu et al. in, "Preparation of Weakly Agglomerate Nanometer $ZrO_2$(3 mol % $Y_2O_3$) Ceramic Powder", Journal of the European Ceramic Society (1993) pp. 157–160, disclose a gel co-precipitation process. The separated solids contain molecularly mixed zirconium and stabilizer ions.

After separating the solids, calcining at elevated temperatures crystallizes the mixture. The calcination temperature required for the formation of SZ is typically lower than 1,000° C. and could be as low as 500° C. The stabilized zirconia can have no monoclinic phase in it, i.e. having stabilizer ions distributed with an atomic scale uniformity. The drawbacks of the chemical approaches however include the rather complicated and time consuming processing steps as well as the formation of large volumes of corrosive and hazardous gaseous or liquid wastes. Furthermore, these "wet-chemical" prepared powders are too expensive for use as starting materials in typical powder consuming technologies such as zirconia-based refractories and stabilized zirconia thermal spray powders.

For example, F. Pitts, in U.S. Pat. No. 3,957,500, describes a co-precipitation process for the preparation of stabilized zirconia by preparing an oxide mixture from zirconia powder and yttria concentrate and calcining the mixture at a temperature from 900 to 1500° C. for a period ranging from 1 to 10 hours. Bickford et al., in U.S. Pat. No. 4,810,680, describe a typical commercial process for preparing high-purity-homogeneous stabilized zirconia powder from zirconium basic carbonate and yttrium carbonate starting materials. First dissolving the starting materials in hydrochloric acid forms a hydroxide solution mixture. Then co-precipitating the hydroxide solution mixture with ammonium or sodium hydroxide solution forms a mixed precipitate. Then the process uses the steps of filtrating the precipitate, washing, drying and then calcination within the range of 680 to 980° C. The by-products of this process are a water solution of ammonium or sodium chloride, i.e. supernatant (680 ml/30 g of product) and a weak-water solution of the same salts, i.e. wash water (500 ml/30 g of product). Umento et al.'s U.S. Pat. No. 6,255,242 describes another precipitation process for the production of zirconium and cerium-based mixed oxide. This process admixes zirconium basic sulfate (insoluble in water) with a solution of cerium salt, preferably nitrate, followed by adding a base (sodium, potassium or ammonium hydroxide or carbonate of sodium or ammonium) to precipitate cerium hydroxide and to convert zirconium basic sulfate into zirconium hydroxide. This method provides high chemical homogeneity of the product—when calcined at 660° C. for 3 hours, it forms the crystal phase of the mixed zirconium-cerium oxide having a cubic phase purity of not less than 95 percent by volume, commonly less than 1 percent monoclinic phase by volume.

Chemical sol-gel processes, such as those described in U.S. Pat. No. 5,750,459 to Marella et al., require exacting separation techniques. For example, Marella et al. describe a sol-gel process for preparing spheres and microspheres of stabilized zirconia powders using zirconium basic carbonate as a starting material. Dissolving the zirconium basic carbonate in nitric acid solution produces the zirconia sol. Then mixing yttrium or cerium nitrate solution with the sol and dripping it in a gelation bath of ammonium hydroxide solution obtains gel spheres or microspheres. After separating these gel spheres from the gelation bath, the gel spheres require rinsing with water, drying and calcination at a temperature higher than 550° C. to form spherical or microspherical stabilized zirconia powder. This powder is useful as either a catalyst or catalyst support. The high filtration rate of gelated particles is a significant benefit of this process in comparison to traditional hydroxide precipitation techniques. But liquid and gaseous wastes stream utilization still remains a major drawback of the process. This process, despite its technological benefits, still has the disadvantages of generation of sodium, potassium or ammonium sulfate- and nitrate-containing waste water streams. In addition, the process requires deep washing of the precipitate to remove by-products. Otherwise, if washing is incomplete, then sulfur oxides or $NO_x$ off-gases will escape from a furnace during the precipitate calcining.

The other method for manufacturing SZ powders is the solid-state process. In this method, milling a mixture of zirconium oxide powder and an oxide of metal-stabilizer in water forms a blended mixture. After the milling step, filtration, evaporation or spray-drying separates the constituents from the water. Finally, a high temperature calcining of the milled mixture forms the SZ powder. This solid-state approach is technologically simple to perform and not complicated with respect to waste stream treatment; and the typical by-products are recyclable waste water and water steam. The disadvantages of this approach include its high calcination temperature, typically higher than 1300° C., and the low uniformity of the product—content of the monoclinic phase can be as high as 25 to 30 percent by volume. In an attempt to minimize or eliminate the presence of the monoclinic zirconia phase, manufacturers have repeatedly remilled and recalcined the product and used ultra-fine zirconia powders to improve blending. Unfortunately, both of these options result in significant increase of production costs; and thus manufacturers rarely use these techniques in manufacturing SZ powders for refractories or for production of SZ thermal spray powders.

Nakada et al., in U.S. Pat. No. 4,542,110, describe a process for producing zirconium oxide sintering body by ball-milling of a zirconium and yttrium oxide blend, drying the resulting mixture and calcining at a temperature higher than 1300° C., preferably from 1400 to 1500° C. for 10 to 120 min. After this, repeating the blending and calcining steps increases the stabilized cubic phase content to at least 95 percent. In a similar process, Otagiri et al., in U.S. Pat. No. 4,360,598, disclose a method of producing yttrium stabilized zirconia ceramic by mixing a powder of amorphous zirconia or zirconia powder having a crystallite size less than 0.1 μm with yttrium oxide or any other salt of yttrium including yttrium oxalate—a thermal decomposition of zirconium chloride, zirconium nitrate or zirconium hydroxide at a temperature of 500 to 1050° C. produces the fine zirconia powder. After mixing, a caulking step at a firing temperature between 1000° C. and 1550° C. provides a sintered ceramic having a predominant tetragonal or cubic structure. In addition to this final caulking step, an optional intermediate calcining of the mixture at 800° C. followed by wet-milling minimizes monoclinic phase content. Unfortunately, this process relates to the formation of an yttrium stabilized ceramic not a powder.

Maschio et al. in "Powder Preparation and Sintering Behaviour of $ZrO_2$-20 mol.-% $CeO_2$ Solid Solutions Prepared by Various Methods" British Ceramic Transactions, Vol. 94, No. 5 (1995) pp. 191 to 195 disclose a mechanical alloying technique for producing ceria-stabilized zironia. Unfortunately, mechanically alloyed powders formed by this technique were reactive at relatively low temperatures and they formed inhomogeneous phases.

SUMMARY OF THE INVENTION

The process produces a stabilized zirconia powder by first contacting zirconium basic carbonate particles with a stabilizer compound. This reacts the zirconium basic carbonate particles with the stabilizer compound through heterogeneous contact to form a stabilized zirconia precursor. The stabilizer compound is for stabilizing a phase structure selected from the group consisting of tetragonal phase, cubic phase and mixtures of tetragonal and cubic phases. And calcining the stabilized zirconia precursor removes gaseous by-products and forms the stabilized zirconia powder. The stabilized zirconia powder has a phase structure selected from the group consisting of tetragonal, cubic and mixtures of tetragonal and cubic.

DETAILED DESCRIPTION

The invention is based on a heterogeneous reaction that occurs by contacting zirconium basic carbonate particles with a stabilizer compound. For purposes of this specification, a heterogeneous reaction means that components involved in the reaction are separated by a phase boundary, e.g. solid and solid, solid and liquid, and solid and gas. The stabilizer compound particles such as, yttrium oxalate, yttrium carbonate, yttrium hydroxide or yttrium oxide react with zirconium basic carbonate to form an amorphous complex product or precursor. The precursor contains chemically bonded and uniformly brought together ingredients such as, zirconium and stabilizer ions combined with oxalic ions, carbonate ions, chemically bonded water, hydrated water or any combination of these. The precursor may contain another acidic ion or ions as occasion demands. As such, the stabilizer compound may be an acetate, bromide, chloride, nitrate, sulfate or any combination of these. The content of these ions can vary. But advantageously the precursor is water insoluble.

The reaction belongs to the class of heterogeneous chemical reactions. From the theory of heterogeneous chemical reactions, variations in temperature and pressure of the reaction volume as well a variation in particle size of the components will impact the reaction kinetics. These variations will accelerate or slow down the rate of the reaction; but they do not have a significant impact on the ultimate formation of the precursor. Thus since controlling the reaction kinetic parameters has little impact on the precursor, they have little impact on the final stabilized zirconia product.

The heterogeneous solid—solid reaction occurs with or without the presence of a liquid. But if a liquid is present, then the liquid must not dissolve or decompose the zirconium basic carbonate or precursor; and it must not prevent the physical contact between the zirconium basic carbonate particles and the stabilizer compound. Advantageously, contacting such as, mixing or milling occurs in a liquid such as, water, alcohol (e.g. ethanol, iso-propanol) and mixtures thereof to limit dusting of the particles. Most advantageously, the liquid is water. The proportion of water to particles should be sufficient for the mixing of the components. And these proportions also depend upon the technique and equipment used to prepare the precursor.

The mixing or milling time may be selected according to the mixing or milling technique applied for the precursor preparation and other factors, e.g. particle size of the components and temperature of the reaction volume. Generally, however, the mixing or milling time should be not less than 15 minutes, so long as the desired precursor is obtained, the upper limit to the mixing or milling is not particularly restricted. Furthermore, the precursor facilitates mixing or milling in water with zirconium basic carbonate to control dusting. The process is effective with stabilizers in the form of acetates, bromides, carbonates, chlorides, hydroxides, nitrates, oxalates, oxides, sulfates or any mixture or combination of these compounds. Advantageously, the reaction occurs with carbonates, hydroxides, oxalates, oxides or any combination or mixture of these compounds to simplify waste by-product control. For example, the reaction advantageously occurs with yttrium carbonate, yttrium hydroxide, yttrium oxalate, yttrium oxide or a mixture thereof. Most advantageously, this reaction occurs as a solid-to-solid heterogeneous reaction, such as between zirconium basic carbonate and yttrium oxalate.

Known separation techniques, e.g. filtration or spray-drying can separate the liquid such as, water from the precursor. After the liquid separation, i) drying then calcining or ii) calcining directly as a damp powder, converts the precursor into a stabilized zirconia-if milling or mixing occurs without a liquid, then this step is unnecessary. In addition, optionally comminuting the dried precursor before calcination controls final particle size. None of these operations has any significant influence on the formation of the stabilized zirconia during calcining.

After calcining, the stabilized zirconia advantageously has less than about 6 percent by volume monoclinic phase. Most advantageously, the stabilized zirconia has less than about 1 percent by volume monoclinic phase. The zirconium basic carbonate process can produce stabilized zirconia on a commercial scale containing less monoclinic phase than the detectable limit by X-ray diffraction techniques or less than about 1 percent by volume for zirconium phases. Eliminating the detectable monoclinic phase from the zirconia improves coating performance in several of the most demanding applications, such as aerospace and land-based gas turbine engines.

The calcining may occur in air, inert or oxidizing atmospheres. As long as the calcining is sufficient to form the desired stabilized zirconia structure, there is no upper limit to the calcining temperature. Advantageously, the calcining occurs at a temperature of at least about 450° C. to promote the formation of the tetragonal, cubic and mixed tetragonal and cubic phases. Most advantageously, the calcining occurs at a temperature of at least about 500° C. to ensure the formation of the tetragonal, cubic and mixed tetragonal and cubic phases. Calcining times vary according to the calcination temperature and precursor composition. Typically, a soak period of about 1 to 10 hours after heating the precursor to temperature is sufficient. After sintering, comminuting and classification can prepare the powder for a particular application.

Optionally, the precalcination treatment of the precursor may include hydrothermal processing to further improve distribution of the stabilizer. Soaking the precursor in water at a temperature of about 120° C. to 250° C. for at least about one hour provides an effective hydrothermal treatment. If the particles receive sufficient milling or mixing however, this process is unnecessary.

The precursor optionally occurs by mixing or milling zirconium basic carbonate and stabilizer-containing material in a solution that reacts with the stabilizer compounds to form a stabilizer compound such as a stabilizer oxalate "in situ". Advantageously, this in situ reaction occur with a stabilizer material such as carbonates, hydroxides, oxides or mixtures thereof in a solution such as oxalic acid. Advantageously, the in situ reaction forms an yttrium-containing compound. In particular, yttrium-containing materials selected from the group consisting of yttrium carbonate, yttrium hydroxide, yttrium oxide and mixtures thereof are most advantageous yttrium-containing compounds for the in situ formation of an yttrium-containing stabilizer compound. Most advantageously, the in situ formation of the stabilizer compound occurs in a liquid selected from the group consisting of water, alcohol (i.e. ethanol, i-propanol) and mixtures thereof.

Oxalic acid is the most advantageous solution for in situ forming the stabilizer compound. If the process relies upon the in situ formation of yttrium oxalate, then the process operates over a wide range with respect to concentration of the oxalic acid solution, degree of hydration of the oxalic acid or its purity as well as to the sequence of adding of the components. In the in situ formation of yttrium oxalate, the quantity of the oxalic acid in the reaction most advantageously is about 3 to 3.5 mols per mol of yttrium oxide taken as an yttrium compound to provide its complete transformation into the yttrium oxalate. Insufficient quantity of the oxalic acid will not have a negative effect on the final formation of stabilized zirconia according the invention; but the process may require increased milling time to compensate for a slower reaction rate. Furthermore, an increased oxalic acid over the above-mentioned concentration will not have any negative effects on the formation of stabilized zirconia or on the milling time.

In another optional embodiment, mixing or milling the zirconium basic carbonate includes mixing a solution of stabilizer salt such as solutions of acetates, bromides, chlorides, nitrates, sulfates or mixtures thereof with a mixture of carbonates (i.e. ammonium or sodium carbonate), hydroxides, oxalates or mixtures thereof to cause the in situ formation of stabilizer salts such as carbonates, hydroxides, oxalates or mixtures thereof for the heterogeneous reaction with the zirconium basic carbonate. In particular, yttrium-containing materials selected from the group consisting of yttrium acetate, yttrium bromide, yttrium chloride, yttrium nitrate, yttrium sulfate and mixtures thereof are most advantageous for the stabilizer salt-forming reaction. The concentration and quantity of the ammonium and sodium compounds should be sufficient to cause complete formation of the stabilizer compound. This process is less preferable than the solid-to-solid reaction of zirconium basic carbonate and water insoluble compounds, described above, because of the formation some waste water that contains ammonium or sodium salts, e.g. nitrate salt. The volume of the waste however is about ten times less than in any of known "wet-chemical" techniques, since only the stabilizer precipitates in this process.

In another optional embodiment, mixing or milling zirconium basic carbonate and stabilizer hydroxides, oxides or any combination or mixtures of these in an aqueous solution of carbonic acid or in an atmosphere of carbon dioxide gas and water react with the stabilizer compounds to form in situ stabilizer carbonate. This in situ stabilizer carbonate then heterogeneously reacts with the zirconium basic carbonate to form the precursor. Most advantageously, the reaction creates an yttrium stabilizer compound with either yttrium hydroxide or yttrium oxide reacting to form in situ yttrium carbonate.

In another optional embodiment, mixing or milling zirconium basic carbonate with a stabilizer solution of acetates, bromides, chlorides, nitrates, sulfates or mixtures thereof salts (e.g. yttrium nitrate) forms a precursor-containing solution. Then drying the precursor-containing solution removes an excess of a solvent, commonly water, and forms a dry precursor. Most advantageously, this process uses yttrium salts to form an yttrium-containing precursor such as at least one salt solution selected from the group consisting of yttrium acetate, yttrium bromide, yttrium chloride, yttrium nitrate, yttrium sulfate and mixtures thereof. This process is also less advantageous in comparison to the solid-to-solid heterogeneous reaction of zirconium basic carbonate and water insoluble compounds of yttrium, because of the formation of corrosive off-gases, like $NO_x$ during the precursor's calcination.

The zirconium basic carbonate advantageously has a spherical-like or raspberry-like shape and an average particle size of about 5–100 $\mu$m, typically 10–60 $\mu$m. The exact composition of the zirconium basic carbonate ($ZrOCO_3$) is not critical for the process. For example, this process operates with basic carbonate formulations such as, $Zr_2O_3(OH)_2 \cdot CO_2 \cdot 7H_2O$, $4ZrO_2 \cdot CO_2 \cdot 11H_2O$ and mixtures thereof. The process operates with both high purity and low grade zirconium basic carbonate products. In addition, the process operates with zirconium basic carbonate particles having varied zirconia, carbon dioxide and hydrated water contents. Advantageously, the zirconium basic carbonate's zirconia content is less than about 90 percent by weight to reduce formation of monoclinic phase during sintering. For example, zirconia contents higher than about 80 percent by weight result in the formation of stabilized zirconia having greater than 10 percent by volume monoclinic phase. Most advantageously, the zirconium basic carbonate contains less than about 60 percent by weight zirconia to further reduce monoclinic phase in the final product.

The process operates with compounds of stabilizers of tetragonal or cubic zirconia including: calcium, cerium, magnesium, scandium as well as yttrium and other rare earth metals. They may be used individually or in an admixture of two or more of them including admixtures with yttrium. The content and composition of the metal stabilizer or any combination of metal stabilizers determines the properties of the final stabilized zirconia. Most advantageously, the compound is an yttrium compound that forms a precursor and calcines to form YSZ powder.

The stabilizer content, as oxide, in the final stabilized zirconia should not be higher than about 30 percent by weight. Most advantageously, the final stabilized zirconia contains about 3 to 20 percent by weight stabilizer oxide, such as yttria.

EXAMPLES

The following examples and comparative examples illustrate the present invention in further detail. All examples are given for yttrium stabilized zirconia having 7.5 percent by weight yttrium oxide. These examples, however, by no means limit the scope of the present invention.

Example 1

2,387 g of zirconium basic carbonate, containing 1,000 g of zirconium oxide, and 179.3 g of yttrium oxalate, containing 81.1 g of yttrium oxide, were mixed together in 600 ml of water for 1 hour using a high speed mixer with dispersion blades. The resultant precursor was separated from water by filtration and dried. The dry amorphous precursor, showing no lines of a crystalline phase in X-ray diffraction (XRD) patterns, was then calcined at 800° C. in an air atmosphere for 2 hours. The stabilized zirconia's crystal phase was one-hundred percent tetragonal phase—no monoclinic phase was detected.

The resulting filtrate, containing less than 200 mg/l of yttrium and less than 5 mg/l of zirconium was then utilized to prepare the next batch of the product.

Example 2

2,387 g of zirconium basic carbonate, containing 1,000 g of zirconium oxide equivalent, and 165.6 g of yttrium carbonate, containing 81.1 g of yttrium oxide equivalent, were mixed together in 600 ml of water for 1 hour using a high speed mixer with dispersion blades. The resultant precursor was separated from water by filtration and dried. The dry amorphous precursor, showing no lines of a crystalline phase in XRD patters, was then calcined at 800° C. in air for 2 hours.

The crystal phase of the stabilized zirconia obtained was composed of a tetragonal phase only—no monoclinic phase detected.

The filtrate containing less than 300 mg/l of yttrium and less than 5 mg/l of zirconium was then utilized to prepare the next batch of the product.

Example 3

2,387 g of zirconium basic carbonate, containing 1,000 g of zirconium oxide equivalent, and 81.1 g of yttrium oxide powder with the average particle size within the range of 1 to 3 $\mu$m, were mixed together for 2 hour in 500 ml of water by using a high speed mixer with dispersion blades. The resultant precursor was separated from the water by filtration and dried. The dry amorphous precursor, showing no lines of a crystalline phase in XRD patterns, was then calcined at 800° C. in air for 2 hours.

The crystal phase of the stabilized zirconia obtained was composed of mostly tetragonal phase with monoclinic phase content measuring less than 2 percent by volume.

The filtrate containing less than 300 mg/l of yttrium and less than 5 mg/l of zirconium was then utilized to prepare the next batch of the product.

Example 4

163.1 g of oxalic acid dihydrate was dissolved 600 ml of water and admixed with 2,387 g of zirconium basic carbonate, containing 1,000 g of zirconium oxide equivalent. Then 165.6 g of yttrium carbonate containing 81.1 g of yttrium oxide equivalent, was added and the slurry was mixed for 15 minutes using a high speed mixer with dispersion blades. The resultant precursor was separated from water by filtration and dried. The dry amorphous precursor, showing no lines of a crystalline phase in XRD patterns, was then calcined at 800° C. for 2 hours.

The crystal phase of stabilized zirconia obtained was composed of a tetragonal phase only—no monoclinic phase detected.

The filtrate containing less than 150 mg/l of yttrium and less than 5 mg/l of zirconium was utilized to prepare the next batch of the product.

Example 5

163.1 g of oxalic acid dihydrate was dissolved in 600 ml of water and admixed with 2,387 g of zirconium basic carbonate, which was containing 1,000 g of zirconium oxide. Then 81.1 g of yttrium oxide powder with the average particle size within the range of 1 to 3 $\mu$m, was added and the slurry was mixed for 1 hour using a high speed mixer with dispersion blades. The resultant precursor was separated from water by filtration and dried. The dry amorphous precursor, showing no lines of a crystalline phase in XRD patterns, was then calcined at 800° C. for 2 hours.

The crystal phase of stabilized zirconia obtained was composed of a tetragonal phase only—no monoclinic phase detected.

The filtrate containing less than 250 mg/l of yttrium and less than 5 mg/l of zirconium was then utilized to prepare the next batch of the product.

Examples 6 to 10

The loads of components described in the Examples 1 to 5 were mixed by ball-milling using zirconium oxide balls for 16 hours followed by drying the resultant slurries to obtain dry precursors. The XRD examination of all dry amorphous precursors obtained revealed no lines of a crystalline phase.

The calcining of the dry precursors was performed in the same manner as described in Examples 1 to 5. The crystal phase of all the calcined precursors was composed of the tetragonal phase of stabilized zirconia only—no monoclinic phase detected.

Example 17 (Comparative)

1,000 g of fine monoclinic zirconia powder having an average particle size of 0.5 $\mu$m and 90 percent particles with a size less than 1 $\mu$m were blended with 165.6 g of yttrium carbonate containing 81.1 g of yttrium oxide equivalent and ball-milled using zirconia balls for 16 hours in 600 ml of water containing 163.1 g of oxalic acid dihydrate dissolved in it.

The resultant slurry was then dried and calcined at 800° C. in air for 2 hours. Stabilization was not achieved—no tetragonal phase of stabilized zirconia was found by XRD in the product, only monoclinic zirconia and yttrium oxide.

The dried slurry was then calcined at 1550° C. for 2 hours. Only 85 percent by volume of tetragonal phase of stabilized zirconia was found in the calcined product by XRD examination with a balance of 15 percent monoclinic phase.

Example 18 (Comparative)

1030.9 g of amorphous zirconia powder, containing 1,000 g of zirconium oxide equivalent, having specific surface area of 150 sq. m/g, was blended with 165.6 g of yttrium carbonate containing 81.1 g of yttrium oxide equivalent. The blend was ball-milled using zirconia balls for 16 hours in 600 ml of water containing 163.1 g of oxalic acid dihydrate dissolved in it.

The resultant slurry was dried and then calcined at 800° C. in air for 2 hours. Only 20 percent by volume of the tetragonal phase of stabilized zirconia was found in the calcined product by XRD.

The dried slurry was also calcined at 1550° C. for 2 hours. The crystal phase of the product obtained was composed of 90 percent by volume tetragonal phase of stabilized zirconia with the balance being monoclinic phase. Only prolonged calcination for up to 10 hours at 1550° C. resulted in a decrease of the monoclinic phase content down to 6 percent by volume.

The zirconium basic carbonate process provides high chemical homogeneity of stabilized zirconia powder. This process lowers the calcination temperature to as low as 450° C. Furthermore, it provides a quantitative yield of the product from low-cost starting materials without any requirement for specialized equipment or careful process control. In addition, the process advantageously produces a precursor and final product without the presence of corrosive, toxic, hazardous or flammable waste by-products.

Although the invention has been described in detail with reference to certain preferred embodiments, those skilled in the art will recognize that there are other embodiments of the invention within the spirit and the scope of the claims.

We claim:

1. A process for producing a stabilized zirconia powder comprising the steps of:
    a) contacting zirconium basic carbonate particles with a stabilizer compound to react the zirconium basic carbonate particles with the stabilizer compound through heterogeneous contact and to form a stabilized zirconia precursor, the stabilizer compound being for stabilizing a phase structure selected from the group consisting of tetragonal phase, cubic phase and mixtures of tetragonal and cubic phases; and
    b) calcining the stabilized zirconia precursor to remove gaseous by-products and to form the stabilized zirconia powder, the stabilized zirconia powder having a phase structure selected from the group consisting of tetragonal, cubic and mixtures of tetragonal and cubic.

2. The process of claim 1 wherein the contacting includes the zirconium basic carbonate reacting with the stabilizer compound selected from the group consisting of carbonates, hydroxides, oxalates, oxides and mixtures thereof.

3. The process of claim 2 wherein the contacting occurs in a liquid selected from the group consisting of water, alcohol and mixtures thereof.

4. The process of claim 1 including the additional step of in situ reacting a stabilizer-containing material to form the stabilizer compound for use in the contacting step.

5. The process of claim 4 wherein the in situ reacting to form the stabilizer compound occurs in a liquid selected from the group consisting of water, alcohol and a mixture thereof.

6. The process of claim 4 wherein the stabilizer-containing material is selected from the group consisting of stabilizer carbonates, hydroxides, oxides and mixtures thereof and the in situ reacting to form the stabilizer compound occurs in a solution of oxalic acid.

7. The process of claim 4 wherein the stabilizer-containing material is selected from the group consisting of acetates, bromides, chlorides, nitrates, sulfates and mixtures thereof and the in situ reacting to form the stabilizer compound occurs in a solution selected from the group consisting of carbonates, hydroxides, oxalates and mixtures thereof.

8. The process of claim 4 wherein the stabilizer-containing material is selected from the group of hydroxides, oxides and mixtures thereof and the in situ reacting to form the stabilizer compound occurs in a media selected from the group consisting of a solution of carbonic acid, an atmosphere of carbon dioxide and water, and mixtures thereof.

9. The process of claim 1 wherein the heterogeneous reaction includes mixing the zirconium basic carbonate with at least one stabilizer salt solution selected from the group consisting of acetates, bromides, chlorides, nitrates, sulfates and mixtures thereof to form a precursor-containing solution and including the additional step of drying the resultant mixture to separate the stabilized zirconia precursor from the precursor-containing solution.

10. A process for producing a stabilized zirconia powder comprising the steps of:
    a) contacting zirconium basic carbonate particles with an yttrium-containing compound to react the zirconium basic carbonate particles with the yttrium-containing compound through heterogeneous contact and to form an yttria stabilized zirconia precursor, the yttrium-containing compound being for stabilizing a phase structure selected from the group consisting of tetragonal phase, cubic phase and mixtures of tetragonal and cubic phases; and
    b) calcining the yttria stabilized zirconia precursor to remove gaseous by-products and to form an yttria stabilized zirconia powder, the yttria stabilized zirconia powder having a phase structure selected from the group consisting of tetragonal, cubic and mixtures of tetragonal and cubic.

11. The process of claim 10 wherein the contacting includes the zirconium basic carbonate reacting with the yttrium-containing compound selected from the group consisting of yttrium carbonate, yttrium hydroxide, yttrium oxalate, yttrium oxide and a mixture thereof in a liquid selected from the group consisting of water, alcohol and mixtures thereof.

12. The process of claim 10 including the additional step of in situ reacting an yttrium-containing material to form the yttrium-containing compound for use in the contacting step.

13. The process of claim 12 wherein the in situ reacting to form the yttrium-containing compound occurs in a liquid selected from the group consisting of water, alcohol and a mixture thereof.

14. The process of claim 12 wherein the yttrium-containing material is selected from the group consisting of yttrium carbonate, yttrium hydroxide, yttrium oxide and mixtures thereof and the reacting to form the yttrium-containing compound occurs in a solution of oxalic acid.

15. The process of claim 12 wherein the yttrium-containing material is selected from the group consisting of yttrium acetate, yttrium bromide, yttrium chloride, yttrium nitrate, yttrium sulfate and mixtures thereof and the in situ reacting to form the yttrium-containing compound occurs in a solution selected from the group consisting of carbonates, hydroxides, oxalates and mixtures thereof.

16. The process of claim 12 wherein the yttrium-containing material is selected from the group of yttrium hydroxide, yttrium oxide and mixtures thereof and the in situ reacting to form the yttrium-containing compound occurs in a media selected from the group consisting of a solution of carbonic acid, an atmosphere of carbon dioxide and water, and mixtures thereof.

17. The process of claim 10 wherein the heterogeneous reaction includes mixing the zirconium basic carbonate with at least one salt solution selected from the group consisting of yttrium acetate, yttrium bromide, yttrium chloride, yttrium nitrate, yttrium sulfate and mixtures thereof to form a precursor-containing solution and including the additional step of drying the resultant mixture to separate the yttria stabilized zirconia precursor from the precursor-containing solution.

18. The process of claim 10 wherein the stabilized zirconia powder contains about 3 to 20 weight percent yttria.

19. The process of claim 10 wherein the calcining forms the stabilized zirconia powder containing less than about 6 percent monoclinic phase by volume.

20. The process of claim 18 wherein the calcining forms the stabilized zirconia powder containing less than about 1 percent monoclinic phase by volume.

* * * * *